H. K. ROYER & W. S. BOWEN.
INDICATOR FOR MILK BOTTLES.
APPLICATION FILED JULY 13, 1916.
1,233,404.
Patented July 17, 1917.
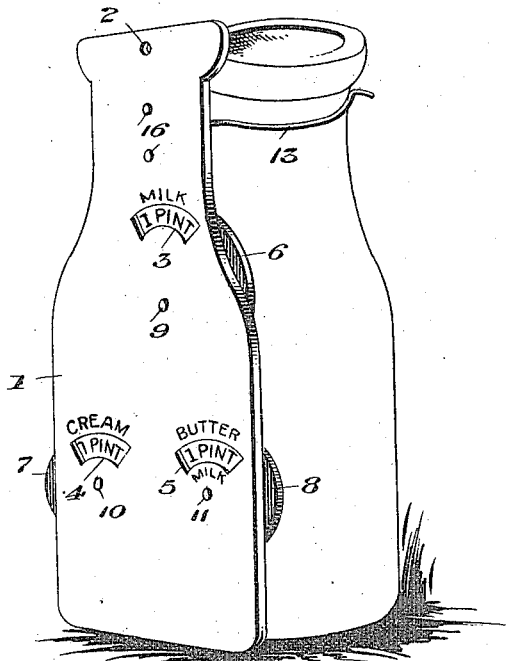
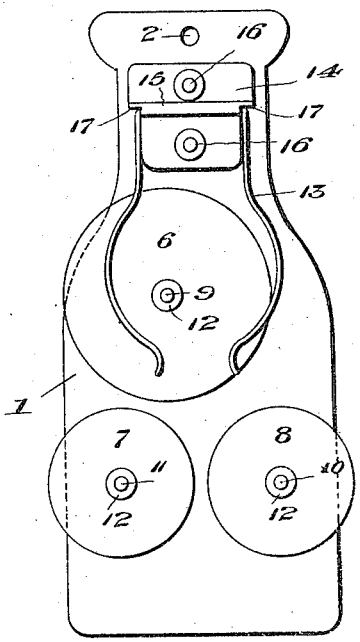
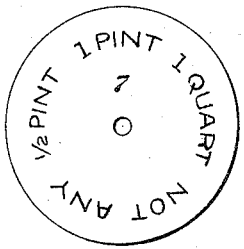
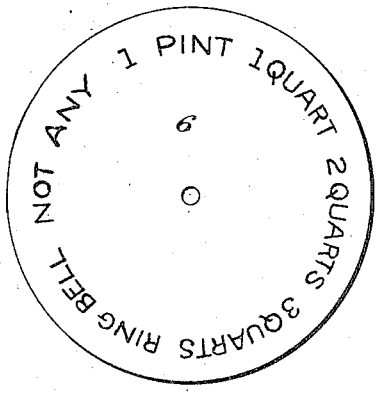
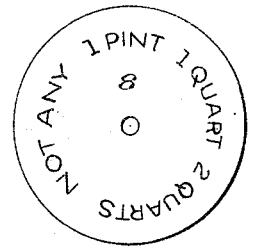
Inventors
Harry K. Royer
William S. Bowen
Witness
By
Attorney

UNITED STATES PATENT OFFICE.

HARRY K. ROYER AND WILLIAM S. BOWEN, OF NORRISTOWN, PENNSYLVANIA.

INDICATOR FOR MILK-BOTTLES.

1,233,404.

Specification of Letters Patent.

Patented July 17, 1917.

Application filed July 13, 1916. Serial No. 109,133.

*To all whom it may concern:*

Be it known that we, HARRY K. ROYER and WILLIAM S. BOWEN, citizens of the United States, residing at Norristown, county of Montgomery, and State of Pennsylvania, have invented certain new and useful Improvements in Indicators for Milk-Bottles, of which the following is a specification.

This invention relates to indicators for milk bottles.

Our object is to provide a simple, inexpensive and durable indicator which can be quickly and easily applied to, or removed from, a milk bottle and, after setting, will be adapted to inform the milkman the quantity of milk, cream, or buttermilk which may be desired by the user, or to impart any other necessary or desirable information.

Our invention contemplates the provision of a backing or body with one or more improved indicating devices, and a novel clip or attaching device, whereby the indicator may be detachably connected to the milk or cream bottle and will stand in upright position so as to be readily observable by the milkman.

The invention may be conveniently embodied in the construction hereinafter set forth and shown in the accompanying drawings, but as it is susceptible of modification, we do not limit ourselves to the precise details of construction which we have disclosed.

In the accompanying drawings:

Figure 1 is a view showing the indicator applied to a milk bottle;

Fig. 2, a rear view of the indicator alone;

Fig. 3, a detail of the indicating disk for milk;

Fig. 4, a detail of the indicating disk for cream; and

Fig. 5, a detail of the indicating disk for buttermilk.

The backing or body 1 may be of pasteboard, sheet metal, or any other material of sufficient rigidity and durability. It may have the outline of a milk or cream bottle and be of substantially the same size as the bottle with which it is to be used, but its contour and size are not essential. An opening 2 may be provided in the upper portion of the backing for hanging the device on a nail, when not in use. At suitable points arc-shaped openings 3, 4 and 5 are provided in the backing 1, and adjacent these respective openings may appear on the backing or body 1 the words "Milk"; "Cream"; and "Butter-milk."

The indicating disks 6, 7 and 8, which are, respectively, shown in detail in Figs. 3, 4 and 5, are pivoted in any suitable manner to the backing 1 at 9, 10 and 11, respectively. The pivots may be in the form of rivets whose heads are on the front of the backing and whose rear ends are upset against washers 12, which assist in frictionally holding the indicating disks against the rear face of the backing 1 so that they will be prevented from accidental turning and will offer a slight resistance to manipulation. The edges of the respective disks project from the edges of the backing 1 so as to be adapted for convenient application of the finger of the user for the purpose of turning them.

The indicating disk 6 may bear any suitable indicia or words. The matter appearing on the disk 6, as shown in Fig. 3, is arranged as follows: "1 pint"; "1 quart"; "2 quarts"; "3 quarts"; "Ring bell"; "Not any." The indicating disk 7 appearing in Fig. 4, may bear any suitable indications, as for instance "½ pint"; "1 pint"; "1 quart"; "Not any." The indicating disk 8, shown in Fig. 5 may bear desirable matter, such for instance as "1 pint"; "1 quart"; "2 quarts"; "Not any."

The indicating disks may be set to expose, through the sight openings 3, 4 and 5, the information it is desired to convey to the milkman. In one indicator we provide for notification of what quantities, if any, of milk, cream and butter-milk are desired. This information may be imparted to the milkman by a single device such as we have described, or, separate complete indicators may be used for the respective bottles for milk, cream and buttermilk.

To adapt the backing and indicators carried thereby to be quickly applied to or removed from a milk bottle, we provide a clip 13 of springy material whose arms are adapted to snap around the neck of the bottle and whose cross-piece is hinged in a metal strip 14 having a ridge 15 and connected to the backing 1 by rivets or suitable fastenings 16. When not in use, the clip 13 hangs flat against the back of the disk 6 so that it is out of the way and the entire device can then be readily suspended from a nail by means of the opening 2. On raising the clip 13 to a generally horizontal position, it impinges against the lugs or stops 17 on the plate 14, thus preventing further movement.

Having thus described our invention, what we claim as new and desire to secure by Letters Patent, is:—

An indicator for milk bottles comprising a backing or body having indicating means, a plate provided with lugs or stops, and a clip having springy arms adapted to embrace the neck of the bottle and provided with a cross-piece which is hinged to the plate and is adapted to abut the lugs or stops when said clip is raised, said clip being adapted to be folded alongside the backing or body.

In testimony whereof, we hereunto affix our signatures.

HARRY K. ROYER.
WM. S. BOWEN.

Copies of this patent may be obtained for five cents each, by addressing the "Commissioner of Patents, Washington, D. C."